(12) United States Patent
Huang

(10) Patent No.: US 11,543,319 B2
(45) Date of Patent: Jan. 3, 2023

(54) ARCH BRACKET FOR DIAPHRAGM PRESSURE GAUGE

(71) Applicant: ZHONGSHAN FUMAO SEALS-TECH CO., LTD., Zhongshan (CN)

(72) Inventor: Chang-Ching Huang, Zhongshan (CN)

(73) Assignee: ZHONGSHAN FUMAO SEALS-TECH CO., LTD., Zhongshan (CN)

( * ) Notice: Subject to any disclaimer, the term of this patent is extended or adjusted under 35 U.S.C. 154(b) by 5 days.

(21) Appl. No.: 17/408,473

(22) Filed: Aug. 22, 2021

(65) Prior Publication Data

US 2022/0390312 A1    Dec. 8, 2022

(30) Foreign Application Priority Data

Jun. 7, 2021    (CN) .......................... 202110629597.6

(51) Int. Cl.
*G01L 19/00*        (2006.01)
*G01L 19/14*        (2006.01)

(52) U.S. Cl.
CPC .................................. *G01L 19/141* (2013.01)

(58) Field of Classification Search
CPC . G01L 19/147; G01L 9/0072; G01L 19/0645; G01L 19/0084; G01L 13/025; G01L 19/0007; G01L 9/0042; G01L 19/0038; G01L 9/0073; G01L 9/0075; G01L 9/0054; G01L 9/0055; G01L 19/04; G01L 7/00; G01L 7/04; G01L 19/148; G01L 19/143; G01L 19/14; G01L 17/00; G01L 7/18; G01L 15/00; G01L 19/0092; G01L 9/0051; G01L 7/041; G01L 9/065; G01L 9/12; G01L 19/0618; G01L 9/0052; G01L 7/16; G01L 9/125; G01L 19/0609; G01L 9/007; G01L 19/003; G01L 19/0627; G01L 9/0022; G01L 19/0046; G01L 7/084; G01L 9/06; G01L 19/0636; G01L 13/02; G01L 19/0023; G01L 19/142; G01L 7/043; G01L 19/08; G01L 9/0002; G01L 9/008; G01L 19/02; G01L 19/141; G01L 9/006;

(Continued)

(56) References Cited

U.S. PATENT DOCUMENTS 4,685,336 A * 8/1987 Lee .......................... G01L 7/084
73/715
4,838,090 A * 6/1989 Hestich ..................... G01L 7/04
73/737

FOREIGN PATENT DOCUMENTS

CN       212932221 U  *  4/2021

* cited by examiner

*Primary Examiner* — Andre J Allen

(57) ABSTRACT

The present disclosure provides an arch bracket for a diaphragm pressure gauge, comprising a bottom, first windows, ribs, second windows and a top arranged in order, the first windows and the second windows being arranged alternately, taking one of the first windows as an example, two sides of the first window being respectively provided with a first fulcrum and a third fulcrum, and a middle of the first window being provided with a second fulcrum, the first fulcrum and the third fulcrum being used to connect the bottom and the ribs, and the second fulcrum being used to connecting the ribs and the top, and the second fulcrum being located on a vertical line between the first fulcrum and the third fulcrum. By setting the pre-punched notches on the pre-punched part, the first windows and the second windows on the formed part are formed by the pre-punched notches.

4 Claims, 1 Drawing Sheet

(58) Field of Classification Search
CPC ......... G01L 11/02; G01L 23/18; G01L 23/10; G01L 19/0672; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 9/16; G01L 11/00; G01L 27/007; G01L 27/002; G01L 9/0026; G01L 19/00; G01L 9/0089; G01L 9/045; G01L 9/14; G01L 1/2281; G01L 11/025; G01L 11/008; G01L 19/0654; G01L 7/22; G01L 9/0047; G01L 13/026; G01L 9/0076; G01L 9/0025; G01L 9/0035; G01L 13/00; G01L 19/0061; G01L 9/0005; G01L 9/08; G01L 9/10; G01L 9/0019; G01L 11/006; G01L 21/00; G01L 7/08; G01L 9/04; G01L 9/0041; G01L 9/0008; G01L 11/004; G01L 19/086; G01L 9/0057; G01L 1/18; G01L 19/069; G01L 19/10; G01L 19/16; G01L 13/023; G01L 7/048; G01L 9/0016; G01L 9/0027; G01L 9/0086; G01L 9/00; G01L 9/0079; G01L 11/04; G01L 9/0048; G01L 9/0091; G01L 19/06; G01L 23/24; G01L 7/182; G01L 11/002; G01L 9/0663; G01L 27/00; G01L 7/166; G01L 1/20; G01L 23/22; G01L 9/0036; G01L 1/02; G01L 9/0061; G01L 9/0039; G01L 23/125; G01L 9/0013; G01L 9/0092; G01L 21/04; G01L 7/104; G01L 9/0045; G01L 19/145; G01L 9/0033; G01L 9/0083; G01L 9/0098; G01L 1/142; G01L 7/24; G01L 1/2293; G01L 9/0029; G01L 21/22; G01L 9/02; G01L 7/022; G01L 9/0064; G01L 23/08; G01L 23/16; G01L 5/14; G01L 7/088; G01L 7/163; G01L 9/0007; G01L 1/205; G01L 23/222; G01L 9/0085; G01L 1/16; G01L 1/2212; G01L 1/2287; G01L 13/06; G01L 9/0004; G01L 21/14; G01L 23/02; G01L 9/003; G01L 9/025; G01L 9/085; G01L 1/14; G01L 1/148; G01L 9/0058; G01L 9/105; G01L 7/061; G01L 9/002; G01L 7/02; G01L 13/028; G01L 1/2231; G01L 23/28; G01L 9/0095; G01L 1/162; G01L 7/12; G01L 9/0032; G01L 9/0038; G01L 19/0076; G01L 7/024; G01L 21/10; G01L 1/246; G01L 19/149; G01L 7/086; G01L 1/005; G01L 7/06; G01L 7/102; G01L 1/2206; G01L 13/021; G01L 27/02; G01L 5/228; G01L 1/2262; G01L 23/00; G01L 9/0094; G01L 1/24; G01L 9/0082; G01L 1/125; G01L 1/26; G01L 11/06; G01L 9/0097; G01L 1/2268; G01L 21/30; G01L 21/34; G01L 23/221; G01L 7/20; G01L 19/144; G01L 23/26; G01L 7/068; G01L 1/225; G01L 23/32; G01L 7/14; G01L 7/187; G01L 1/144; G01L 1/165; G01L 23/12; G01L 1/146; G01L 1/241; G01L 7/045; G01L 1/086; G01L 7/108; G01L 9/18; G01L 13/04; G01L 17/005; G01L 5/18; G01L 1/127; G01L 1/22; G01L 1/245; G01L 21/32; G01L 1/183; G01L 1/2218; G01L 9/0023; G01L 1/243; G01L 23/145; G01L 5/0047; G01L 9/0088; G01L 1/106; G01L 5/0076; G01L 1/10; G01L 1/186; G01L 23/223; G01L 25/00; G01L 5/165; G01L 9/001; G01L 9/0017; G01L 1/044; G01L 3/245; G01L 5/226; G01L 1/08; G01L 21/16; G01L 3/1485; G01L 5/0052; G01L 5/162; G01L 5/225; G01L 7/026; G01L 7/065; G01L 9/0014; G01L 1/242; G01L 21/24; G01L 3/10; G01L 5/0004; G01L 9/005; G01L 1/00; G01L 1/04; G01L 1/103; G01L 1/2275; G01L 1/247; G01L 21/02; G01L 21/26; G01L 23/225; G01L 3/102; G01L 3/105; G01L 5/0038; G01L 5/223; G01L 5/24; G01L 7/028; G01L 7/10; G01L 9/0011; G01L 5/243; G01L 1/083; G01L 1/12; G01L 21/36; G01L 23/04; G01L 23/14; G01L 23/30; G01L 3/103; G01L 5/00; G01L 5/0028; G01L 5/102; G01L 5/133; G01L 5/166; G01L 7/185; G01L 1/255; G01L 21/08; G01L 5/0033; G01L 5/0057; G01L 5/161; G01L 1/042; G01L 1/122; G01L 1/2225; G01L 1/2243; G01L 1/2256; G01L 1/248; G01L 2009/0066; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/08; G01L 5/10; G01L 5/101; G01L 5/108; G01L 5/16; G01L 5/1627; G01L 5/167; G01L 5/22; G01L 5/28; G01L 23/085; G01L 23/20; G01L 5/0061; G01L 5/0071; G01L 5/008; G01L 5/06; G01L 5/171; G01L 7/106
USPC .................................................. 73/700–756
See application file for complete search history.

ARCH BRACKET FOR DIAPHRAGM PRESSURE GAUGE

TECHNICAL FIELD

The present disclosure relates to the technical field of stamping production, in particular to an arch bracket for a diaphragm pressure gauge.

BACKGROUND

A pressure gauge refers to an instrument with an elastic element as a sensitive element which measures and indicates a pressure higher than an ambient pressure. The pressure gauge is widely used in almost all industrial processes and research fields.

A diaphragm pressure gauge often adopts an arch bracket which is a supporting frame for internal members. The arch bracket in the diaphragm pressure gauge in the prior art is made by multi-die pressing and multi-punching, and side debugging windows are all designed with four-hole uniform distribution. The punching process of the bow frame is complicated, and a debugging window allows a tool to extend into a narrow range, which is not conducive to an installation and debugging of the pressure gauge, and leads to a low production efficiency and a high processing cost.

SUMMARY

Technical Problem

In view of the defects of the prior art, the present disclosure provides an arch bracket for a diaphragm pressure gauge, which solves the technical problem that the arch bracket for the pressure gauge in the prior art has a high production cost and is not conducive to a debugging of the pressure gauge.

Technical Solution

In order to achieve that above object, the present disclosure provides the following technical solution: an arch bracket for a diaphragm pressure gauge, comprising a bottom, first windows, ribs, second windows and a top arranged in order, the first windows and the second windows being arranged alternately, taking one of the first windows as an example, two sides of the first window being respectively provided with a first fulcrum and a third fulcrum, and a middle of the first window being provided with a second fulcrum, the first fulcrum and the third fulcrum being used to connect the bottom and the ribs, and the second fulcrum being used to connecting the ribs and the top, and the second fulcrum being located on a vertical line between the first fulcrum and the third fulcrum.

Preferably, an upper end surface of the top is provided with an opening, one side of the opening is provided with through holes, and the through holes comprise two through holes.

Preferably, a processing technology for processing an arch bracket for a diaphragm pressure gauge, comprising the following steps:
S1. blanking: pre-punching a raw material to form through holes, an opening and pre-punched notches to obtain a pre-punched part; and
S2. forming: forming: stamping the pre-punched part by placing the pre-punched part in a conical die, increasing a height between a bottom and a top, so that the pre-punched notches form first windows and second windows to obtain a formed part.

Preferably, a side surface formed by the ribs of the formed part is a conical surface or a cylindrical surface.

Advantageous Effects

The present disclosure provides an arch bracket for a diaphragm pressure gauge and has the following advantageous effects:
In the present disclosure, a pre-punching notch is provided, and after stamping and forming, debugging windows are formed. Compared with the processing of traditional debugging windows, the present disclosure can not only reduce consumption of materials, but also reduce steps of production process and production cost.

DESCRIPTION OF THE EMBODIMENTS

The technical solution in embodiments of the present disclosure will be clearly and completely described below in conjunction with the accompanying drawings in the embodiments of the present disclosure. It is obvious that the described embodiments are only a part of the embodiments of the present disclosure and not all of the embodiments. Based on the embodiments of the present disclosure, all other embodiments obtained by a person skilled in the art without creative labor fall within the scope of protection of the present disclosure.

Embodiment 1

Figure 2:
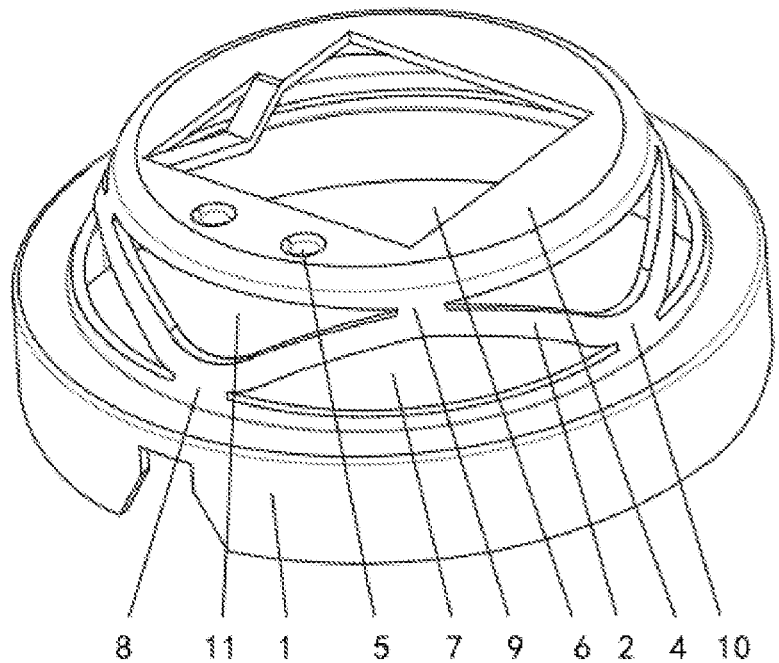
FIG. 2 is a schematic view of the present disclosure after molding.
In which, 1. bottom; 2. rib; 3. pre-punched notch; 4. top; 5. through hole; 6. opening; 7. first window; 8. first fulcrum; 9. second fulcrum; 10. third fulcrum; 11. second window.

As shown in FIG. 2, an embodiment of the present disclosure provides an arch bracket for a diaphragm pressure gauge which includes a bottom 1, first windows 7, ribs 2, second windows 11 and a top 4, arranged in order. The first windows 7 and the second windows 11 are arranged alternately, and when assembling the pressure gauge, a tool is passed through the first windows 7 or the second windows 11 to debug the pressure gauge. Taking one of the first windows 7 as an example, two sides of the first window 7 are respectively provided with a first fulcrum 8 and a third fulcrum 10, and a middle of the first window 7 is provided with a second fulcrum 9. The first fulcrum 8 and the third fulcrum 10 are used to connect the bottom 1 and the ribs 2, and the second fulcrum 9 is used to connecting the ribs 2 and the top 4. The second fulcrum 9 is located on a vertical line between the first fulcrum 8 and the third fulcrum 10.

An upper end surface of the top 4 is provided with an opening 6 for mounting a viewing window for viewing an indication of the pressure gauge, one side of the opening 6 is provided with through holes 5, and the through holes 5 include two through holes and are used for mounting buttons or knobs for zero calibrations of the pressure gauge.

Embodiment 2

Figure 1:
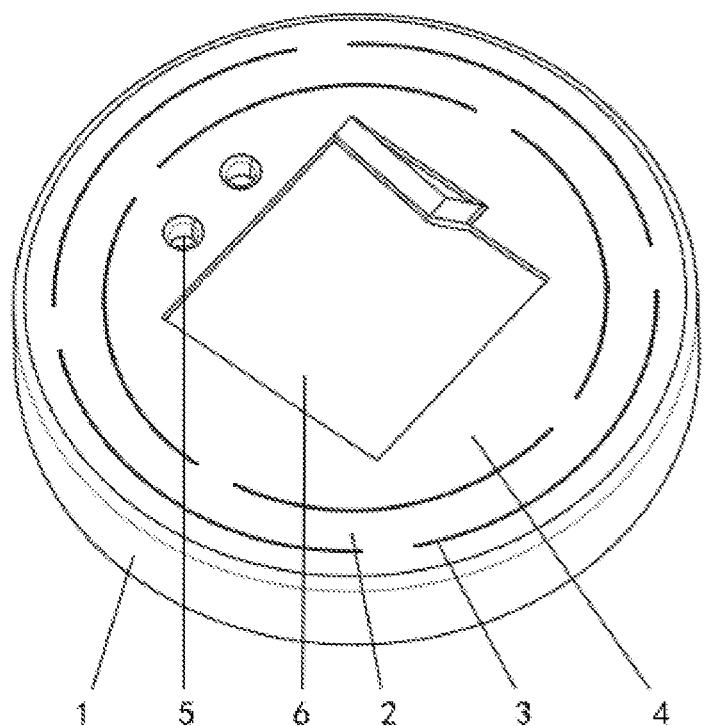
FIG. 1 is a schematic view of the present disclosure before molding.

The present disclosure also provides a processing technology for processing an arch bracket for a diaphragm pressure gauge, which includes the following steps:

S1. blanking: pre-punching a raw material to form through holes 5, an opening 6 and pre-punched notches 3 to obtain a pre-punched part. The specific structure is shown in FIG. 1;

S2. forming: stamping the pre-punched part by placing the pre-punched part in a conical die, increasing a height between a bottom 1 and a top 4, so that the pre-punched notches 3 form first windows 7 and second windows 11 to obtain a formed part. The specific structure is shown in FIG. 2.

A side surface formed by the ribs 2 of the formed part is a conical surface or a cylindrical surface.

Although embodiments of the present disclosure have been shown and described, those ordinary skilled in the art can understand that various changes, variations, substitutions and modifications may be made to these embodiments without departing from the principle and spirit of the present disclosure, and the scope of present disclosure is defined by the appended claims and their equivalents.

What is claimed is:

1. An arch bracket for a diaphragm pressure gauge, wherein comprising a bottom (1), first windows (7), ribs (2), second windows (11) and a top (4) arranged in order, the first windows (7) and the second windows (11) being arranged alternately, taking one of the first windows (7) as an example, two sides of the first window (7) being respectively provided with a first fulcrum (8) and a third fulcrum (10), and a middle of the first window (7) being provided with a second fulcrum (9), the first fulcrum (8) and the third fulcrum (10) being used to connect the bottom (1) and the ribs (2), and the second fulcrum (9) being used to connecting the ribs (2) and the top (4), and the second fulcrum (9) being located on a vertical line between the first fulcrum (8) and the third fulcrum (10).

2. The arch bracket for a diaphragm pressure gauge according to claim 1, wherein an upper end surface of the top (4) is provided with an opening (6), one side of the opening (6) is provided with through holes (5), and the through holes (5) comprise two through holes.

3. A processing technology for processing an arch bracket for a diaphragm pressure gauge, wherein comprising the following steps:
   S1. blanking: pre-punching a raw material to form through holes (5), an opening (6) and pre-punched notches (3) to obtain a pre-punched part; and
   S2. forming: forming: stamping the pre-punched part by placing the pre-punched part in a conical die, increasing a height between a bottom (1) and a top (4), so that the pre-punched notches (3) form first windows (7) and second windows (11) to obtain a formed part.

4. The processing technology for processing an arch bracket for a diaphragm pressure gauge according to claim 3, wherein a side surface formed by the ribs (2) of the formed part is a conical surface or a cylindrical surface.

* * * * *